United States Patent [19]

Winder

[11] 3,711,120
[45] Jan. 16, 1973

[54] MOTORCYCLE TRAIL HITCH

[76] Inventor: Jesse W. Winder, P. O. Box 75, R. D. No. 1, Lambertville, N.J.

[22] Filed: Sept. 10, 1970

[21] Appl. No.: 71,074

[52] U.S. Cl. ................... 280/292, 280/296, 280/402, 280/150 A
[51] Int. Cl. ............................................. B62d 53/04
[58] Field of Search ...... 280/292, 296, 293, 402, 503, 280/7.1, 7.12, 150 A

[56] References Cited

UNITED STATES PATENTS

| | | | |
|---|---|---|---|
| 3,615,105 | 10/1971 | Harris | 280/292 |
| 2,827,307 | 3/1958 | Osborn | 280/504 X |
| 2,647,760 | 8/1953 | Mettetal, Jr. | 280/402 |
| 862,936 | 8/1907 | Phillips | 280/292 X |
| 613,940 | 11/1898 | Ringborg | 280/7.12 |
| 575,692 | 1/1897 | Buell | 280/7.16 |
| 2,280,734 | 4/1942 | Tyler | 280/292 |
| 3,428,332 | 2/1969 | McCance | 280/292 |
| 1,855,172 | 4/1932 | Hess | 280/292 X |

Primary Examiner—Leo Friaglia
Assistant Examiner—John P. Silverstrim
Attorney—Sperry and Zoda

[57] ABSTRACT

A towing device for a motorcycle, or the like, having a mounting member adapted to be fixedly secured to a conventional hitch tongue of an automobile. An arm extends outwardly and upwardly from the mounting member and is adapted for connection with a front fork portion of a cycle to be towed. In one embodiment of the invention, the front axle of the cycle is used as the point of connection between the towing device and the motorcycle. In another embodiment of the invention, a towing bar is provided as part of the arm member and is, itself, directly connected with the front fork portion of the motorcycle in the place of the axle. In another independent feature of the invention, the mounting member may be provided with adjustable guide means for securing the mounting means against lateral slippage with respect to the hitch tongue.

9 Claims, 7 Drawing Figures

PATENTED JAN 16 1973
3,711,120
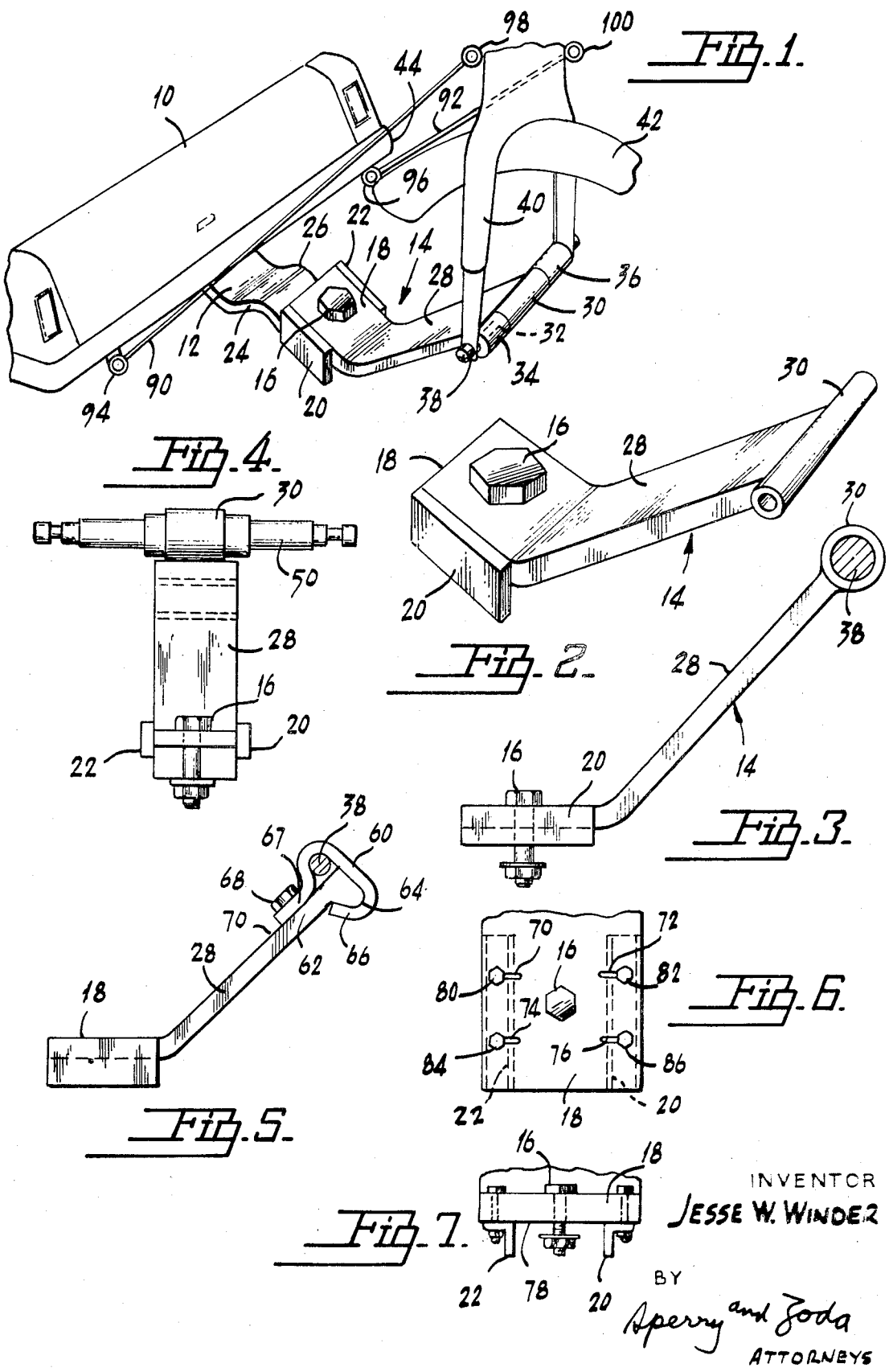
INVENTOR
JESSE W. WINDER
BY
Sperry and Zoda
ATTORNEYS

MOTORCYCLE TRAIL HITCH

BACKGROUND OF THE INVENTION

It is frequently desirable to tow a motorcycle or the like at the rear of an automobile. Past attempts at providing a feasible arrangement for accomplishing this purpose has generally contemplated the supporting of the entire front wheel of a motorcycle in an elevated position while allowing the rear wheel to trail on the ground behind the automobile. An early attempt in this direction is evidenced by U.S. Pat. No. 2,280,734, issued to Tyler on Apr. 21, 1942. The advent of the large motorcycle, which may be of substantial weight and bulk, prompted additional attempts to accommodate the towing of such cycles at the high speeds experienced on our modern highways. Such attempts resulted in unnecessarily elaborate and complicated apparatus which are expensive to produce and difficult to install on an automobile.

OBJECTS AND SUMMARY OF THE INVENTION

It is therefore an object of the present invention to provide a cycle towing arrangement which solves many of the problems attending currently used such arrangements.

It is another object of the present invention to provide a new and improved towing apparatus which insures lateral stability while towing a motorcycle at relatively high speeds and over rough roads.

It is still another object of the present invention to provide a motorcycle towing apparatus wherein the towing vehicle is easily maneuverable.

It is yet another object of the present invention to provide a motorcycle towing arrangement of such construction to be capable of supporting various existing models of motorcycles.

It is a further object of the present invention to provide a motorcycle arrangement which is simple in design and upon which a motorcycle can be mounted with a minimum of physical effort.

It is still a further object of the present invention to provide a motorcycle tow arrangement which is less complicated and expensive than similar such devices that have been known heretofore.

At least some of the above listed objects are achieved by the provision of a towing hitch having a mounting means for connection with a conventional automobile hitch tongue and an arm extending upwardly and outwardly from the mounting means. A free end of the arm member terminates in a connecting portion for receiving the front axle of a motorcycle from which the wheel has been removed.

In one independent feature of the invention, the connecting portion of the arm member may comprise a tow bar which is sized for insertion within the connection means of a front fork of a motorcycle ordinarily provided for mounting the front axle of a motorcycle.

In another independent feature of the invention, the connecting portion may comprise a clamping member formed to secure the existing front axle of a motorcycle, from which the front wheel has been removed, to the arm member of the overall motorcycle towing arrangement.

In still another feature of the present invention, the mounting means may be provided with an adjustable side plate means for laterally stabilizing the connection between the automobile and the front fork of a motorcycle to be towed.

BRIEF DESCRIPTION OF THE DRAWINGS

While the invention is particularly pointed out and distinctly claimed in the concluding portion of the specification, several embodiments are described in the following detailed description which may be best understood when read in connection with the accompanying drawings, in which:

FIG. 1 is a perspective view of an assembly embodying the present invention showing a portion of an automobile and a towed motorcycle;

FIG. 2 is a perspective view illustrating the towing device shown in FIG. 1;

FIG. 3 is a side elevation view of the structure shown in FIG. 2;

FIG. 4 is a front elevation view of one alternative embodiment of the present invention;

FIG. 5 is a side elevation view of a second alternative embodiment of the present invention;

FIG. 6 is a top plan view of a mounting portion of a device according to the present invention, which mounting portion is provided with an adjustable feature comprising a third alternative embodiment of the present invention; and FIG. 7 is a front elevation view of the mounting portion shown in FIG. 6.

DETAILED DESCRIPTION OF THE VARIOUS EMBODIMENTS OF THE PRESENT INVENTION

Referring now to the drawings in which like numerals are used to indicate like parts throughout the various views thereof, FIGS. 1, 2 and 3 show the preferred embodiment of the present invention.

Referring to FIG. 1, the rear portion of an automobile 10 is provided with a conventional hitch tongue 12, which may be secured to the underside of the automobile 10 by any conventional means. A towing hitch, indicated generally as 14 is secured to the tongue 12 by means of a hex-bolt 16.

The overall hitch 14 terminates at one end in a mounting plate 18 through which the hex-bolt 16 is inserted for engagement within a corresponding hole (not shown) formed in the terminal free end of the hitch tongue 12 of the automobile 10. The mounting plate 18 of the overall hitch 14 is held in flush face-to-face relationship with an upper surface of the tongue 12 by the engagement of the hex-bolt 16 through the various holes formed in the mounting plate 18 and the tongue 12.

Side plates 20 and 22 may be provided on the mounting plate 18 to extend downwardly therefrom in a direction generally normal to the planar extension to the mounting plate 18. The side plates 22 and 20 are operable to engage the side edges 24 and 26 respectively of the tongue 12 so as to prevent the mounting plate 18 from swivelling about the mounting bolt 16 with respect to the tongue member 12.

A generally outwardly and upwardly extending support arm 28 projects from the mounting plate 18 as an extension thereof and may terminate in a tubular sleeve-like portion 30 having an axis extending transversely of the general longitudinal extension of the support arm 28.

The tubular sleeve-like portion 30 of the support arm 28 may be formed with a bore 32 sized to receive a conventional front axle 38 of the American type motorcycle, which axle 38 has a generally smooth, not-stepped surface. Shim members 34 and 36 may be provided for centering the tubular sleeve-like portion of the arm 28 on the axle 38 of the motorcycle and for preventing lateral sliding of the tubular sleeve-like portion 30 along the longitudinal extension of the axle 38.

In operation, the front axle, supporting the front wheel of a motorcycle, is removed from the front fork 40 of the motorcycle so as to permit the removal of the front wheel from the front axle. The front axle 38 is then inserted through the tubular sleeve-like portion 30 of the support arm 28 of the overall hitch 14 and the side shims 34 and 36 are placed over the ends of the axle to be in axially abutting relationship with the tubular sleeve-like portion 30. The axial ends of the axle are then mounted within the terminal portions of the motorcycle fork 40 by the existing, conventional fastening means provided on the motorcycle and well known in the art. The bore hole 32 of the tubular sleeve-like portion 30 of the hitch 14 permits the axle 38 to rotate therein while the shim members 34 and 36 prevent lateral movement of the tubular sleeve-like portion 30 along the axial extension of the axle 38.

The outward and upward extension of the supporting arm 28 from the mounting plate 18 is such as to insure that a fender 42 of the motorcycle, and any other such extensions of the motorcycle, do not engage the bumper 44 or any other portion of the towing vehicle. The length of the arm 28 and the angle of the general plane, coincident with the arm 28, with respect to the plane of the mounting plate 18 must be such as to insure that the aforesaid engagement of the motorcycle with the vehicle does not occur even when riding over extremely rough unimproved roads or down driveways and the like. The angle subtended by the plane containing the supporting arm 28 and the plane of the mounting plate 18 may comprise an angle of approximately 45° and the length of the supporting arm 28 between the mounting plate 18 and the center line of the tubular sleeve-like portion 30 may be approximately 6 to 8 inches. Of course, these dimensions may vary with the various applications of the overall hitch assembly without departing from the present invention.

Referring to FIG. 4, one alternative embodiment of the present invention is shown wherein a towing bar 50 is welded within the tubular sleeve-like portion 30 of the supporting arm 28. This arrangement is especially adaptable for towing motorcycles of the British type, wherein the front axle is of a stepped construction similar to the tow bar member 50. Of course, once the wheel and front axle of an American motorcycle is removed from the front fork portion 40 of the motorcycle, the tow bar arrangement shown in FIG. 4 could be used therein as well as being usable in motorcycles of the English type.

FIG. 5 shows a second alternative embodiment of the present invention wherein the connecting means for attaching the support arm 28 with the front axle 38 of the motorcycle, comprises a clamp-like member 60, which may be C-shaped in cross-sectional configuration. The free terminal end 62 of the supporting arm 28 defines a generally downwardly extending rounded projection 64 disposed generally transversely of the longitudinal extension of the arm 28. A first portion 66 of the C-shaped clamping member 60 engages under the projection 64 so as to be generally pivotable thereabout. A second portion 67 of the generally C-shaped clamping member 60 may be provided with a threaded fastening means 68 for securing the second portion 67 of the clamping member 60 to an upper surface 70 of the support arm 28 through a hole (not shown) formed therein. The clamping member 60 may be of steel or any suitable material having some degree of flexibility while being sufficiently rigid to maintain the pivotable connection between the curved portion 66 of the clamping member 60 and the rounded projection 64 of the supporting arm 28. By using the connecting means shown in FIG. 5, the overall hitching assembly is provided with universal application, in that the clamping member 60 may be utilized with virtually any front axle configuration.

FIGS. 6 and 7 illustrate a third alternative embodiment of the present invention wherein the side plates 20 and 22 of the mounting plate 18 are provided with an adjustable feature. Elongated slots 70, 72, 74 and 76 may be formed in the mounting plate 18 to extend generally transversely of the longitudinal extension of the supporting arm 28 rigidly secured to the mounting plate 18 or formed as an extension thereof. The side plates 20 and 22 may then be secured to the underside 78 of the mounting plate 18 by means of threaded fastening means 80, 82, 84 and 86. By this arrangement, hitch tongues 12 of virtually any width may be accommodated by placing the side plates 20 and 22 in abutting relationship with the side edges 24 and 26 of the tongue 12. Of course, only one side plate need be used if desired.

It can thus be seen that a new and improved motorcycle tow hitch has been herein provided which is less complicated and expensive than heretofore known. The towing hitch of the present invention facilitates the connecting of a motorcycle with a towing vehicle, while providing substantial lateral stability at high towing speeds and over relatively rough roads. The motorcycle towing hitch of the present invention may be universally applied to virtually all types of motorcycles as well as to various widths of existing automobile hitch tongues. If additional lateral stability is required, two guy wires may be used. Each side of the front fork of the motorcycle may be connected with one end of each guy wire, and the other end of each guy wire may be attached to the rear bumper assembly of the towing automobile at laterally spaced points. For example, FIG. 1 shows guy wires, 90 and 92, secured to eye bolts, 94 and 96, on the automobile bumper 44 and eye bolts, 98 and 100, at the sides of the front fork 40 of the motorcycle. Of course, conventional hardware such as turnbuckles may be incorporated in the guy wire assembly.

SCOPE OF THE INVENTION

While what has been shown are several embodiments of the present invention, it is, of course, understood that various modifications and charges may be made therein without departing from the true spirit and scope of the invention. Therefore, it is intended to cover in the following claims all such modifications and charges as may fall within the true spirit and scope of the present invention.

I claim:
1. A hitch for towing a cycle comprising:

A mounting plate provided with fastening means for securing said mounting plate to a towing tongue member on a vehicle;

a support arm extending upwardly and rearwardly from said mounting plate;

connecting means provided at a free terminal end of said supporting arm, said connecting means operable to secure the front fork of a motorcycle to said vehicle, the front wheel of said motorcycle having been removed;

said support arm comprising an elongated member having a length which is of a magnitude several times greater than the width thereof;

said connecting means being supported by said supporting arm in a position disposed above the level of said mounting plate and displaced horizontally beyond the rear of said mounting plate and vehicle;

said connecting means also being positioned above the normal level of the axis of the front wheel of the motorcycle when the front wheel is operationally mounted on the motorcycle for the normal driving of the motorcycle, apart from a towing vehicle; and whereby said hitch is operable to support the front end of the motorcycle up and rearwardly away from the rear end of the towing vehicle so as to preclude engagement of the motorcycle with the towing vehicle, even when towing over extremely rough, unimproved roads or down driveways, and the like.

2. A hitch according to claim 1, wherein said connecting means includes a transversly extending tubular member through which a rod-like element extends for attachment to the front fork of the cycle.

3. A hitch as defined in claim 1, wherein said mounting plate defines a substantially flat surface with a generally vertically extending fastening means passing therethrough, for securing said plate to said towing tongue member of said vehicle; and side plate means extends downwardly from said mounting plate for abutting engagement with at least one side edge of said towing tongue member, with said side plate means being operable to restrict the movement of said mounting plate with respect to said tongue member.

4. A hitch according to claim 3, wherein said side plate means is laterally adjustable, with respect to the longitudinal, front and rear extension of said towing tongue member.

5. An apparatus according to claim 4, wherein said side plate is connected to a lower surface of said mounting plate by threaded fastening means extending from base portions of said side plate and further extending through elongated slots formed in said mounting plate; and said elongated slots extend generally transversely of the longitudinal, front and rear extension of said supporting arm.

6. Apparatus according to claim 1, wherein the angle defined between said support arm and a horizontal plane coinciding with said mounting plate comprises an angle of approximately 45° and the length of said supporting arm is within the range of 5 to 10 inches.

7. An apparatus according to claim 1 wherein, said connecting means comprises a clamping means engageable with the front axle of said motorcycle with the front wheel removed.

8. Apparatus according to claim 7, wherein said clamping means is further provided with threaded fastening means at a second end thereof and is formed to receive a front axle of said motorcycle, with the front wheel removed;

said front axle being urged against an upper surface of a terminal end of said supporting arm by said clamping means upon the threaded fastening of said fastening means on said clamping member.

9. Apparatus according to claim 1, wherein said connecting means comprises a rod member extending generally transversely of the longitudinal extension of said supporting arm and disposed at a terminal free end thereof; and said rod being engageable within recesses formed within the front fork of a motorcycle for normally receiving the front axle thereof, after the front axle and front wheel of said motorcycle have been removed.

* * * * *